Figure 1:
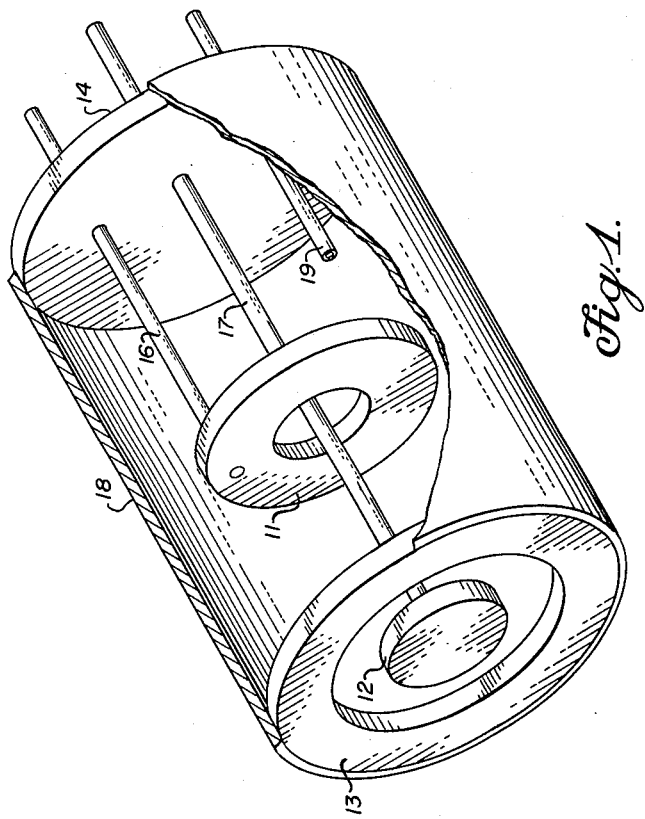

March 6, 1962 H. P. FURTH ETAL 3,024,182
PLASMA ENERGIZATION

Filed Nov. 12, 1959 2 Sheets-Sheet 1

INVENTORS
HAROLD P. FURTH
EDMUND S. CHAMBERS

BY Roland A. Anderson
ATTORNEY

March 6, 1962     H. P. FURTH ETAL     3,024,182
PLASMA ENERGIZATION

Filed Nov. 12, 1959     2 Sheets-Sheet 2

INVENTORS.
HAROLD P. FURTH
EDMUND S. CHAMBERS

BY Roland A. Anderson

ATTORNEY.

United States Patent Office 3,024,182
Patented Mar. 6, 1962

3,024,182
PLASMA ENERGIZATION
Harold P. Furth, Berkeley, and Edmund S. Chambers, Walnut Creek, Calif., assignors to the United States of America as represented by the United States Atomic Energy Commission
Filed Nov. 12, 1959, Ser. No. 852,584
7 Claims. (Cl. 204—193.2)

The present invention relates generally to the heating of materials in the gaseous state to extremely high temperature, and is particularly directed to an improved method and apparatus for heating ions in a magnetically confined plasma by viscous damping of hydromagnetic waves in the plasma.

The problem of heating or energizing a plasma, recently of importance in the field of nuclear physics, poses severe difficulties by virtue of the plasma constituting a space charge neutralized ionized gas including both electrons and positively charged ions. Such coexistence of charges of opposite polarities detrimentally influences the transfer of energy to the plasma ions by the application of electric fields. Applied electric fields effect the ions and electrons oppositely, resulting usually in charge separation and polarization of the plasma. Charge sheaths of a single polarity may be formed which screen significant portions of the plasma from the applied electric field or at least minimize the penetration of the field into the plasma. The transfer of energy from the electric field to the plasma ions is hence limited by polarization as is therefore the maximum temperature to which the plasma may be heated.

The raising of materials in the ionized gaseous state, viz., existing as a plasma, to extremely high temperatures is valuable for a variety of purposes. These high temperatures may be employed to promote various nuclear and chemical reactions between the gaseous constituents which would not otherwise occur at lower temperatures, as well as for purposes of controlled thermonuclear reactions where the temperatures are of extremely high order. In addition, the energetic particles in a plasma raised to high temperature may be extracted from the plasma by means well known in the art for injection into various particle accelerators or other charged particle utilization apparatus. Accordingly, considerable effort has been expended in the suppression of polarization in a plasma under the influence of an applied electric field to the ends of increasing the energy transferred to the plasma and maximum attainable ion temperature or energy therein. Unfortunately, existing methods and means for accomplishing the foregoing while suppressing polarization to a significant extent have not been entirely effective.

By the present invention, method and means are provided for transferring the energy from an applied radio frequency electric field to a magnetically confined plasma wherein the self-shielding effect of plasma polarization is substantially entirely eliminated and, accordingly, the plasma ions may be raised to temperatures heretofore unattainable with comparable existing schemes of plasma energization.

It is therefore an object of the present invention to provided maximum energy transfer to the ions of a magnetically confined plasma from a driving electric field.

Another object of the invention is the provision of a method and apparatus for the delivery of energy directly to the ions of a plasma rather than through an electron intermediary.

It is still another object of the present invention to provide for the energization of ions in a magnetically confined plasma by an applied radial radio frequency field without the usual attendant self-shielding polarization of the plasma.

Yet another object of the invention is the provision of method and apparatus for the generation of hydromagnetic rotational waves driven by a radial radio frequency electric field applied at an end of an axially and radially magnetically confined plasma and extending axially to an intermediate position within the plasma whereat energy is transferred to the plasma ions by viscous damping of the wave.

Still another object of the present invention is to provide ion cyclotron resonance heating in the medial regions of a magnetically confined plasma without physical electrodes for applying the energizing electric field existing in the regions of heating.

It is a further object of the present invention to provide anode and cathode structure for facilitating the propagation of ion cyclotron waves axially through a magnetically confined plasma.

It is a still further object of this invention to provide electrode structure of the class described wherein a cathode sheath serve as an insulator to radio frequency energy in the region of the electrodes.

Figure 2:
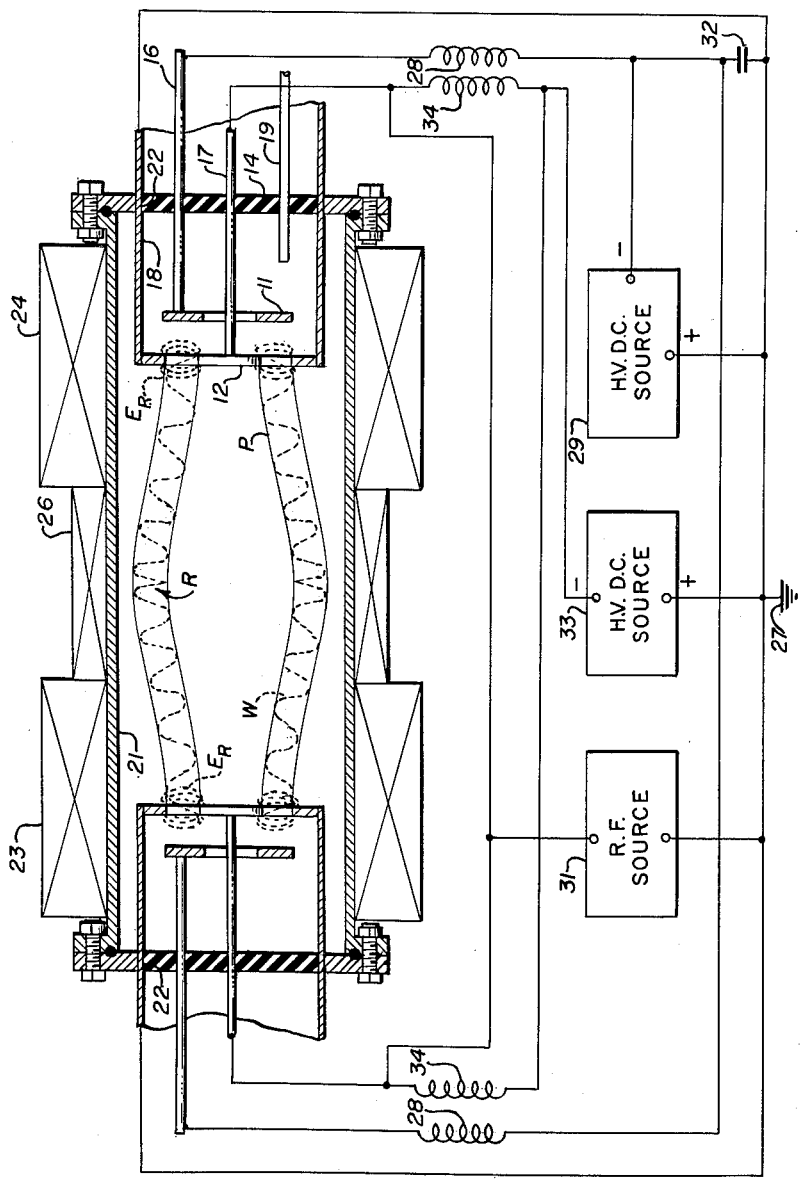

Additional objects and advantages of the invention will become apparent from the following description and claims considered together with the accompanying drawing, of which:

FIGURE 1 is a perspective view with portions in broken-out section of a preferred embodiment of electrode structure for accomplishing plasma energization or heating in accordance with the present invention; and FIGURE 2 is a cross sectional elevation view of plasma magnetic confinement apparatus embodying the electrode structure of FIG. 1 for heating the plasma ions to extremely high temperatures.

Considering now the invention in some detail relative to the method thereof, it is contemplated that there will first be provided a magnetically confined plasma, the ions of which it is desired to heat to elevated temperatures for purposes of initiating and promoting chemical or nuclear reactions between the ions or the like. The plasma may be produced by initiating a reflex or PIG discharge in a substantially evacuated region containing material in the gaseous state or in any other manner of which many are well known in the art. The magnetic field for confining the plasma is not limited to any specific configuration, for example, a uniform axially symmetric field for effecting only radial confinement of the plasma may be employed. However, it is preferred that magnetic confinement of the plasma be effected axially as well as radially, in which case a mirror field configuration defined by an axially symmetric magnetic field having regions of increased intensity terminally bounding a central region of substantially uniform lesser intensity is implied. Such a field configuration may be generated for example by a pair of coaxially spaced solenoids energized in additive series, a pair of solenoids disposed concentrically about the respective end regions of a third solenoid and all energized in additive series, or the like. With such a magnetic confinement field established coaxially of a reflex discharge or otherwise in the region of the plasma, the plasma is confined as an axial column in the central region of lesser field intensity to extend between substantially the transverse medial portions of the end regions of increased field intensity.

Heretofore, various methods and means have been employed to heat the ions of a magnetically confined plasma to elevated temperatures by the application of radio frequency electric fields. For example, a pair of electrodes may be transversely spaced on opposite sides of the plasma and radio frequency potential applied between the electrodes at the gyromagnetic (Larmor) frequency of the plasma ions in the particular value of magnetic field confining same. At such frequency the radio frequency field imparts rotational energy to the ions in a cumulative manner each half cycle of the field. By virtue of the increased rotational energy of the ions, however, their orbital radii are also increased to the extent that there is a severe tendency for the ions to impinge the electrodes and be lost. Moreover, by virture of the increased orbital radii of the energetic ions compared to those of the relatively unenergetic and less massive electrons, these charged plasma constituents become radially separated resulting in radial polarization of the plasma. As mentioned previously, polarization minimizes the penetration of the radio frequency field into the plasma and materially limits the transfer of energy to the plasma ions.

According to the method of the present invention, however, radio frequency energy is imparted to the ions of a magnetically confined plasma by viscous damping of hydromagnetic waves propagated through the plasma column to a medial region thereof by application of a radial radio frequency electric field to an end of the column. The radio frequency energy is transferred to the plasma in such medial region as if radio frequency electrodes were disposed thereat and yet the electrodes for establishing the applied field are remotely disposed in an unobstructing location at an end of the column. Moreover, inasmuch as the wave motion is established in the plasma column per se, there is no charge separation of the plasma constituents and attendant polarization of the plasma. To these ends, a radio frequency electric field $E_R$ is applied, as depicted in FIG. 2, radially to the end of the plasma column P, e.g., in one or both regions of increased intensity of the preferred magnetic mirror field configuration noted hereinbefore for radially and axially confining the plasma column. Such an applied field, $E_R$, creates a rotational wave which propagates axially through the plasma column to a region R, where the ion cyclotron frequency is in agreement with frequency of the wave. In such region of ion cyclotron resonance, the ions absorb energy from the wave by viscous damping. A hydromagnetic wave, W, is thus established between the point of application of the field, $E_R$, and the region, R, of ion cyclotron resonance. The frequency of the applied radio frequency field is preferably adjusted equal the ion cyclotron frequency corresponding to the magnetic field strength at the medial region of the plasma column. In other words the frequency, $f$, of the applied radio frequency field, $E_R$, is best adjusted relative to the strength of the magnetic confining field according to the expression:

$$f = \frac{eB_0}{2\pi mc}$$

where $e$ = charge of the ions
$B_0$ = magnetic field intensity in the medial region of the plasma column
$m$ = mass of the ions
$c$ = velocity of light In addition, two hydromagnetic waves, W, are preferably established in accordance with the foregoing to extend from the respective ends of the plasma column to the medial region, R, of ion cyclotron resonance. In the medial region of the plasma column a substantial amount of wave energy is hence delivered by viscous damping of the waves directly to the ions in the form of transverse motion of same.

It is to be further noted that the dielectric constant of a plasma confined in a mirror field configuration gradually increases inwardly from the respective ends of the column to a maximum at the medial region thereof. Inasmuch as wavelength varies as an inverse function of the dielectric constant of the medium through which a wave is propagated, the wavelength of hydromagnetic waves, W, propagated from the ends to the medial region of the magnetic mirror field confined plasma column, P, is hence long at the ends thereof and progressively diminishes to the vanishing point at the medial region, R, of ion cyclotron resonance. Consequently adjacent wavelengths are relatively close to each other in the medial region of the plasma column and phase mixing by intermingling of ions from adjacent wavelengths is extremely effective. Thermalization of the ions in the medial region of the plasma therefore proceeds at a relatively rapid rate and by virtue of the effectiveness of wave energy transfer to the ions, nuclear or chemical reactions between the ions may be conducted at materially higher temperatures than heretofore realizable. In addition, if desired the high energy ions may be extracted from the plasma column as, for example, by the periodic application of a high potential electric extraction field positively decreasing radially outward from medial region of the plasma column.

The wave plasma energization method of the present invention may be further employed to enhance the confinement of plasma in a magnetic field simultaneously with ion energization. More particularly, the radial driving field $E_R$ applied to the end of the plasma column may be modified to include in addition to the radio frequency component, a D.C. component which tends to increase the drift kinetic energy of the plasma ions about the axis of the column with respect to axial kinetic energy. Such increase in drift kinetic energy causes an average centrifugal force to be exerted upon the plasma ions which centrifugally enhances confinement of same.

Considering now preferred apparatus for conducting the wave energization method described hereinbefore, as best illustrated in FIG. 1 of the drawing, there is seen to be provided electrode structure, a pair of which may be oppositely mounted in spaced relation coaxially of a magnetic confinement field within a low pressure region to establish a reflex discharge for the ionization of gas introduced to the region and establishment of a plasma column between the electrode structures. In addition, each electrode structure includes provision for the application of a radial radio frequency field to the ends of the plasma column with high efficiency whereby the hydromagnetic standing waves may be propagated therethrough for transfer of the radio frequency energy to the plasma ions in an intermediate region of the column at ion cyclotron resonance with the frequency of the driving field.

To these ends the electrode structure includes a ring cathode 11 spaced coaxially rearward from an inner circular disc anode 12 and outer concentric ring anode 13 radially spaced therefrom. These electrodes are secured in the above-noted relationship to a circular disc insulator 14. More particularly, the ring cathode 11 is mounted in coaxially spaced relation to insulator 14 by means of a longitudinal support member 16 secured at one end to the cathode and extending at its other end eccentrically through the insulator in rigid sealed relation thereto. The disc anode 12 is similarly mounted coaxially forward of the cathode by means of a support member 17 of greater length than member 16 secured at one end to the center of the cathode and extending coaxially through the central opening of the ring cathode and center of the insulator in rigid sealed relation thereto. The support members 16, 17 are both preferably of electrically conducting material to facilitate electrical energization of the cathode 11 and anode 12 by connection of the energizing circuits to the ends of the members projecting from the outer face of the insulator 14. The support members 16, 17 further are best tubular in construction to facilitate the circulation of a coolant to the electrodes and thereby prevent overheating during operation.

The concentric ring anode 13 is secured to the disc insulator 14 as by means of an elongated hollow cylindrical support member 18 preferably of electrically conducting material. The anode 13 and insulator 14 are secured concentrically within the opposite ends of the member 18 and in pressure sealed relation therewith. To complete the electrode structure, a gas inlet tube 19 may be sealably mounted in longitudinal extension through the insulator 14 to facilitate admittance of gas to the interior of the electrode configuration.

With a pair of the electrode structures physically described hereinbefore oppositely disposed coaxially of a magnetic field, a negative direct current potential may be applied to the respective cathodes 11 and gas introduced to the interelectrode region to establish a PIG or reflex discharge. An annular column of plasma is thus established coaxially between the cathodes, which column passes through the annuli defined by the anodes 12, 13 of the respective electrode structures. A radio frequency potential may then be applied between the concentric anodes of at least one of the electrode structures to thereby establish the radial radio frequency driving field across the plasma column for propagating hydromagnetic waves longitudinally therethrough. Furthermore, an ion sheath is formed in the region between the cathode and anodes by virtue of ions attracted toward the cathode accumulating in the region forwardly adjacent same. The radio frequency impedance of the ion sheath is high so that the cathode cannot short-out the oscillating radio frequency field between the anodes and most of the field hence appears across the plasma column.

Considering now more specifically the manner in which the electrode structure of the present invention is employed in a device for the magnetic confinement of a plasma, by way of example the electrode structure is illustrated in FIG. 2 as embodied in a device for generating an axially symmetric confinement field in an evacuated space for the radial and axial confinement of plasma therein (viz. a mirror field). As shown in the figure, there is provided a hollow cylindrical vacuum tank 21 the ends of which are each provided with a central opening 22 for receiving the electrode structure of the present invention. Concentrically about the opposite ends of the tank 21 there are disposed axially spaced mirror field solenoids 23, 24 and a central field solenoid 26 is advantageously, although not necessarily, interposed therebetween concentrically about the tank. The solenoids are direct current energized in additive series while the turns density of the solenoids 23, 24 is greater than that of solenoid 26 or the solenoids and energizing means are otherwise arranged to generate an axially symmetric magnetic mirror field in the low pressure region enclosed by the vacuum tank 21. As mentioned previously, the mirror field is characterized by gradientially-intensified end mirror regions terminally bounding a central field region of lesser intensity. Maximum intensity of the mirror fields is at the transverse median planes of the solenoids 23, 24.

The electrode structures of the present invention are respectively mounted concentrically within the openings 22 in the ends of the vacuum tank 21, the electrode members 18 being secured in pressure sealed relation to the edges of the openings to maintain vacuum conditions within tank 21. The electrode structures project coaxially into the interior of the tank with the transverse median planes through the respective concentric anodes 12, 13 being preferably coextensive with the transverse median planes of solenoids 23, 24. The concentric anodes of the electrode structures are hence disposed at the peaks of the gradientially-intensified end mirror regions of the magnetic confinement field.

As regards the electrical energization of the electrode structures to the ends of ionizing gas introduced to the interior of vacuum tank 21, for example through inlet tube 19, and producing a plasma energized by hydromagnetic waves, a D.C. potential is applied to the cathodes 11 of the electrode structures which is negative relative to the D.C. potential at the concentric anodes 12, 13 thereof. In addition, a radio frequency voltage is applied between the concentric anodes of each electrode structure, preferably at the ion cyclotron frequency for the magnetic field intensity in the medial regions of the vacuum tank. More particularly, the member 18 of each electrode structure is best connected to ground as indicated generally at 27, the outer anode 13 and the walls of the vacuum tank 21 being thus also at ground potential. Each of the members 16 supporting cathodes 11 is connected through an R.F. choke 28 to the negative terminal of a D.C. voltage source 29, the positive terminal of which is connected to ground. Each of the members 17 supporting center anodes 12 is connected to a radio frequency voltage source 31 operated with reference to ground, radio frequency voltage being thus applied between the concentric anodes. In addition, a radio frequency by-pass capacitor 32 is connected between the negative terminal of D.C. source 29 and ground.

With the foregoing connections accomplished, the gas introduced to the vacuum tank 21 is ionized in the reflex discharge established between the cathodes 11. The annular column of plasma, P, is produced which extends between the cathodes and follows generally the contour of the flux lines of the magnetic mirror confinement field. The plasma column passes coaxially through the annulus between the concentric anodes 12, 13 of the respective electrode structures. The radio frequency voltage source 31 coupled to the anodes 12, 13 establishes the radial radio frequency field $E_R$ therebetween and hence across the ends of the plasma column P in accordance with the method of the invention described hereinbefore. The remainder of the operation of the invention hence follows the method. By preference, the frequency of the source and therefore the field $E_R$ is adjusted to ion cyclotron resonance with the plasma ions in the medial region of the vacuum tank 21, viz., $$f = \frac{eB_0}{2\pi mc}$$

Radio frequency voltage is isolated from the cathodes 11 by the high radio frequency impedance cathode ion sheath inherently established in the region between the concentric anodes and cathode. Any small amount of radio frequency voltage conducted to the cathodes is isolated from the cathode direct current voltage supply 29 by the radio frequency chokes 28 and by-pass capacitor 32.

By virtue of the cathode sheath, the cathodes 11 cannot short-out the corresponding concentric anodes 12, 13 and substantially all of the resultant radio frequency driving field $E_R$ appears across the plasma. As noted previously, relative to the method, the driving fields $E_R$ propagate hydromagnetic standing waves, W, longitudinally through the plasma column P to the region of ion cyclotron resonance at the medial region of the column. In this region the waves damp out and the wave energy is converted into energy of rotational ion motion. Such energization of the plasma ions may be utilized to good advantage to promote various nuclear and chemical reactions between the resulting extremely high energy ions at substantial reaction rates. The reaction products formed by ion combinations are neutral and therefore free to diffuse from the magnetic field. The reaction products may hence be collected upon collecting blankets or other suitable means (not shown) disposed peripherally within the medial region of the vacuum tank.

Alternatively, the resulting high energy ions in the medial region of the vacuum tank may be extracted from the plasma column for introduction to various ion utilization apparatus. This may be accomplished by ion extraction structure well known in the art and therefore not disclosed in detail herein. An annular slotted extractor electrode may be, for example, concentrically disposed at the medial portion of the vacuum tank and insulated therefrom. Where no central field solenoid 26 is employed, ion egress is provided directly through the slots of the extractor. With the solenoid 26, egress openings between the turns thereof are provided in registry with the slots of the extractor. The extractor electrode is periodically pulsed highly negative to thus extract the energetic ions from the plasma radially through the egress slots or openings for use in auxiliary equipment.

When the apparatus of the present invention is employed in the chemical and nuclear reaction application noted hereinbefore, it is sometimes desirable that the magnetic confinement of the plasma be enhanced during the wave energization. As previously disclosed relative to the method, plasma confinement is centrifugally enhanced by providing a direct current component in the radio frequency driving field. To this end the apparatus of the present invention may be modified to include a direct current voltage source 33 having its negative terminal connected through radio frequency chokes 34 to the center anode support members 17 of the electrode structures. With the resultant D.C. component included in the radio frequency driving fields generated between the concentric anodes 12, 13 the waves through the plasma exert an average centrifugal force thereon which enhances confinement.

While the invention has been disclosed herein with respect to a single preferred embodiment, it will be apparent that numerous variations and modifications may be made within the spirit and scope of the invention, and thus it is not intended to limit the invention except by the terms of the following claims.

What is claimed is:

1. Plasma energization structure for paired disposition in opposed spaced relation coaxially of a magnetic field established in a low pressure gaseous atmosphere comprising a pair of anodes disposed in radially spaced concentric relationship, radio frequency source means coupled in energizing relation to said anodes to apply a radio frequency voltage therebetween, a cathode disposed in coaxially spaced relation to said anodes, and direct current voltage source means connected between said anodes and said cathode to apply a potential thereto negative with respect to the anodes.

2. Plasma energization electrode structure comprising a circular disc insulator, a ring cathode mounted coaxially forward of said insulator, a circular disc anode mounted coaxially forward of said cathode, a ring anode disposed concentrically about said disc anode, and an electrically conducting hollow cylindrical member concentrically secured between said insulator and ring anode in outwardly radially spaced relation to said cathode.

3. Plasma energization electrode structure comprising a circular disc insulator, a ring anode coaxially spaced from said insulator, an electrically conducting open-ended hollow cylinder coaxially secured between said anode and said insulator in pressure sealed relation thereto, a circular disc anode concentrically disposed within said ring anode in radially spaced relation thereto, an electrically conducting cylindrical support member centrally secured to said disc anode and extending coaxially therefrom through the center of said insulator in rigid sealed relation thereto, a ring cathode disposed within said cylinder intermediate said anodes and insulator and concentrically spaced about said support member, a second support member secured to said cathode and extending longitudinally therefrom eccentrically through said insulator in rigid sealed relation thereto, and a gas inlet tube extending in sealed relation through said insulator into communication with the interior of said cylinder.

4. Plasma energization apparatus comprising means for generating an axially symmetric magnetic field in an evacuated space, said field having axially spaced gradientially-intensified mirror field regions terminally bounding a less intense central field region, means disposed within said space for generating a reflex discharge coaxially between the mirror field regions, means for admitting gas to the discharge within said space, said gas being ionized therein to produce a column of plasma confined by said magnetic field and extending between the mirror field regions thereof, and means for generating a radial radio frequency electric field across at least one end of the plasma column to propagate a hydromagnetic wave therethrough to a region at ion cyclotron resonance with said radio frequency electric field.

5. Plasma energization apparatus comprising a vacuum tank enclosing a low pressure region, solenoid means including at least a pair of spaced solenoids disposed concentrically about the end regions of said vacuum tank for establishing therein an axially symmetric magnetic field having gradientially-intensified mirror field regions situated therein of peak intensity at the transverse median planes of the solenoids, means for admitting gas to the interior of said tank, a pair of circular disc anodes respectively coaxially disposed within said tank with their transverse median planes coextensive with the transverse median planes of said solenoids, a pair of ring anodes respectively disposed within said tank in concentrically spaced relation about said disc anodes and in electrically conductive connection with said tank, said ring anodes connected to ground, a pair of ring cathodes respectively disposed coaxially rearward of said disc anodes, a direct current voltage source having its negative terminal coupled to said cathodes and its positive terminal connected to ground, and a radio frequency voltage source coupled to said disc anodes and operating with respect to ground, said radio frequency voltage source having a frequency, $f$, given by:

$$f = \frac{eB_0}{2\pi mc}$$

where $B_0$ is the intensity of the magnetic field in the medial region of said vacuum tank, $$\frac{e}{m}$$

is the charge to mass ratio of the ionic constituent of said gas, and $c$ is the velocity of light.

6. Plasma energization apparatus according to claim 5, further defined by a second direct current voltage source having its negative terminal connected to said disc anodes and its positive terminal connected to ground.

7. Plasma energization apparatus comprising means for establishing a magnetically confined column of plasma, and means for generating a radial radio frequency electric field across at least one end of said plasma column to propagate a hydro-magnetic wave therethrough to a region of the column at ion-cyclotron resonance with said radio frequency electric field.

References Cited in the file of this patent

UNITED STATES PATENTS

| | | |
|---|---|---|
| 2,325,865 | Litton | Aug. 3, 1943 |
| 2,920,234 | Luce | Jan. 5, 1960 |
| 2,920,235 | Bell et al. | Jan. 5, 1960 |
| 2,920,236 | Chambers et al. | Jan. 5, 1960 |
| 2,831,996 | Martina | Apr. 22, 1960 |